(12) United States Patent
Satish et al.

(10) Patent No.: US 10,904,295 B2
(45) Date of Patent: *Jan. 26, 2021

(54) DYNAMICALLY UPDATING FEATURE SET RECOMMENDATION DATABASES

(71) Applicant: Splunk Inc., San Francisco, CA (US)

(72) Inventors: Sourabh Satish, Fremont, CA (US); Oliver Friedrichs, Woodside, CA (US); Atif Mahadik, Fremont, CA (US); Govind Salinas, Sunnyvale, CA (US); Ryan Russell, El Cerrito, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,070

(22) Filed: Mar. 12, 2020

(65) Prior Publication Data
US 2020/0344268 A1 Oct. 29, 2020

Related U.S. Application Data

(63) Continuation of application No. 16/393,803, filed on Apr. 24, 2019, now Pat. No. 10,630,727, which is a continuation of application No. 15/206,632, filed on Jul. 11, 2016, now Pat. No. 10,320,845.

(60) Provisional application No. 62/190,356, filed on Jul. 9, 2015.

(51) Int. Cl.
*H04L 29/06* (2006.01)
*G06F 21/57* (2013.01)
*G06F 21/00* (2013.01)

(52) U.S. Cl.
CPC .............. *H04L 63/20* (2013.01); *G06F 21/00* (2013.01); *G06F 21/577* (2013.01)

(58) Field of Classification Search
CPC ....................................................... H04L 63/20
See application file for complete search history.

(56) References Cited

U.S. PATENT DOCUMENTS

| | | |
|---|---|---|
| 7,841,008 B1 | 11/2010 | Cole et al. |
| 8,266,698 B1 | 9/2012 | Seshardi et al. |
| 2008/0244691 A1 | 10/2008 | Hilerio et al. |

OTHER PUBLICATIONS

Non-Final Office Action from U.S. Appl. No. 15/206,632, dated Jul. 2, 2018, 8 pages.
Non-Final Office Action, U.S. Appl. No. 16/393,803, dated Aug. 22, 2019, 6 pages.
Notice of Allowance from U.S. Appl. No. 15/206,632, dated Jan. 24, 2019, 11 pages.
Notice of Allowance, U.S. Appl. No. 16/393,803, dated Dec. 16, 2019, 5 pages.

*Primary Examiner* — Simon P Kanaan
(74) *Attorney, Agent, or Firm* — Nicholson De Vos Webster & Elliott LLP

(57) ABSTRACT

Systems, methods, and software described herein provide for identifying recommended feature sets for new security applications. In one example, a method of providing recommended feature sets for a new security application includes identifying a request for the new security application, and determining a classification for the new security application. The method further provides identifying related applications to the new security application based on the classification, and identifying a feature set for the new security application based on features provided in the related applications.

20 Claims, 7 Drawing Sheets

FEATURE SET DATA STRUCTURE 400

| APPLICATION NAMES 410 | APPLICATION TYPES 411 | FEATURES 412 | FEATURES 413 |
|---|---|---|---|
| APPLICATION 420 | APP TYPE 430 | FEATURE | FEATURE |
| APPLICATION 421 | APP TYPE 430 | FEATURE | FEATURE |
| APPLICATION 422 | APP TYPE 430 | FEATURE | FEATURE |
| APPLICATION 423 | APP TYPE 430 | FEATURE | FEATURE |
| APPLICATION 424 | APP TYPE 431 | FEATURE | FEATURE |
| APPLICATION 425 | APP TYPE 431 | FEATURE | FEATURE |
| APPLICATION 426 | APP TYPE 431 | FEATURE | FEATURE |
| APPLICATION 427 | APP TYPE 432 | FEATURE | FEATURE |

FIGURE 4

AVAILABLE FEATURES DATA STRUCTURE
600

| FEATURE IDENTIFIERS 610 | COMMAND STRUCTURES 611 | DESCRIPTIONS 612 | OTHER INFORMATION 613 |
|---|---|---|---|
| IDENTIFIER 620 | COMMAND | DESCRIPTION | INFORMATION |
| IDENTIFIER 621 | COMMAND | DESCRIPTION | INFORMATION |
| IDENTIFIER 622 | COMMAND | DESCRIPTION | INFORMATION |
| IDENTIFIER 623 | COMMAND | DESCRIPTION | INFORMATION |
| IDENTIFIER 626 | COMMAND | DESCRIPTION | INFORMATION |
| IDENTIFIER 625 | COMMAND | DESCRIPTION | INFORMATION |
| IDENTIFIER 626 | COMMAND | DESCRIPTION | INFORMATION |
| IDENTIFIER 627 | COMMAND | DESCRIPTION | INFORMATION |

FIGURE 6

DYNAMICALLY UPDATING FEATURE SET RECOMMENDATION DATABASES

CROSS-REFERENCE TO RELATED APPLICATIONS

This application is a continuation of U.S. patent application Ser. No. 16/393,803, filed Apr. 24, 2019, which is a continuation of U.S. patent application Ser. No. 15/206,632, filed Jul. 11, 2016, issued as U.S. Pat. No. 10,320,845, which application claims the benefit of, and priority to, U.S. Provisional Patent Application No. 62/190,356, entitled "RECOMMENDED SECURITY ACTION FEATURE SETS", filed Jul. 9, 2015, which applications are hereby incorporated by reference in their entirety for all purposes.

TECHNICAL FIELD

Aspects of the disclosure are related to computing environment security, and in particular to recommending security action feature sets.

TECHNICAL BACKGROUND

An increasing number of data security threats exist in the modern computerized society. These threats may include viruses or other malware that attacks the local computer of the end user, or sophisticated cyber-attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

In some implementations, computing networks may employ a variety of computing assets with different hardware and software configurations to provide the desired operation of the network. These computing assets may include end user computing devices, host computing devices, virtual machines, switches, routers, and the like. However, as more computing assets are initiated within the computing network, it may become difficult and burdensome for an administrator to manage the different software configurations of the computing assets, and apply security actions to the various security applications in the network. Further, it may be difficult for a developer to generate new security applications, such as firewalls, antivirus applications, and ticketing applications that can efficiently be applied within a computing environment with other applications.

Overview

The technology disclosed herein offers enhancements for providing a unified feature set for applications from multiple distributors. In one example, a method of providing recommended feature sets for a new security application includes identifying a request for the new security application, and determining a classification for the new security application. The method further provides identifying related applications to the new security application based on the classification, and identifying a feature set for the new security application based on features provided in the related applications.

In another implementation, a computing apparatus includes one or more non-transitory computer readable storage media, a processing system operatively coupled with the one or more non-transitory computer readable storage media, and program instructions stored on the one or more non-transitory computer readable storage media that direct the processing system to identify a request for a new security application. The program instructions further direct the processing system to determine a classification for the new security application, identify related applications to the new security application based on the classification, and identify a feature set for the new security application based on features provided in the related applications.

In a further implementation, an apparatus includes one or more non-transitory computer readable storage media, and program instructions stored on the one or more non-transitory computer readable storage media that direct a processing system to identify a request for a new security application. The program instructions further direct the processing system to determine a classification for the new security application, identify related application to the new security application based on the classification, and identify a feature set for the new security application based on features provided in the related applications.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates a feature set data structure to manage features for a plurality of applications according to one implementation.

FIG. 6 illustrates an available features data set according to one implementation.

TECHNICAL DISCLOSURE

The various examples disclosed herein provide recommended feature sets for new security applications. In particular, security application developers, such as firewall, antivirus, data backup, and ticketing application developers, often develop applications for a variety of distributors and hardware platforms. Because the applications are generated by different distributors, the processes required to implement particular security actions may be different for each application. For example, the processes required to block an internet protocol (IP) address with a first firewall from a first distributor may be different than the processes required to block the same IP address on a second firewall from a second distributor.

Here, to unify the ability of administrators and users to implement particular security actions within computing assets of a computing environment, a feature set database is provided that recommends features that should be implemented across all applications of a particular classification. Accordingly, when multiple distributors produce an application for the same classification, an administrator or user may readily apply the same feature to the various applications executing in their network. For example, if a user required an operation to block an IP address in firewalls from two separate software providers in response to identifying a security threat associated with the IP address, the user may be able to rely on the same feature for the first firewall and the second firewall to implement a required action.

In some implementations, the features in the feature sets employed by the applications may be associated unified application language that can be used by the administrators to apply a security action across applications from multiple distributors. This unified application language permits an administrator or an automated administration system to issue a single command that can then be translated by each of the applications into operations to implement the desired action. For example, once an action is specified by an administrator, the action may be translated by each of the applications configured with the associated feature into the necessary procedures to implement the action within the administrator's environment. Thus, if the administrator specified to "block IP address X on computing assets Y and Z," the action may be translated by the security applications on assets Y and Z into the necessary operations and processes to implement the block IP operation.

Figure 1:
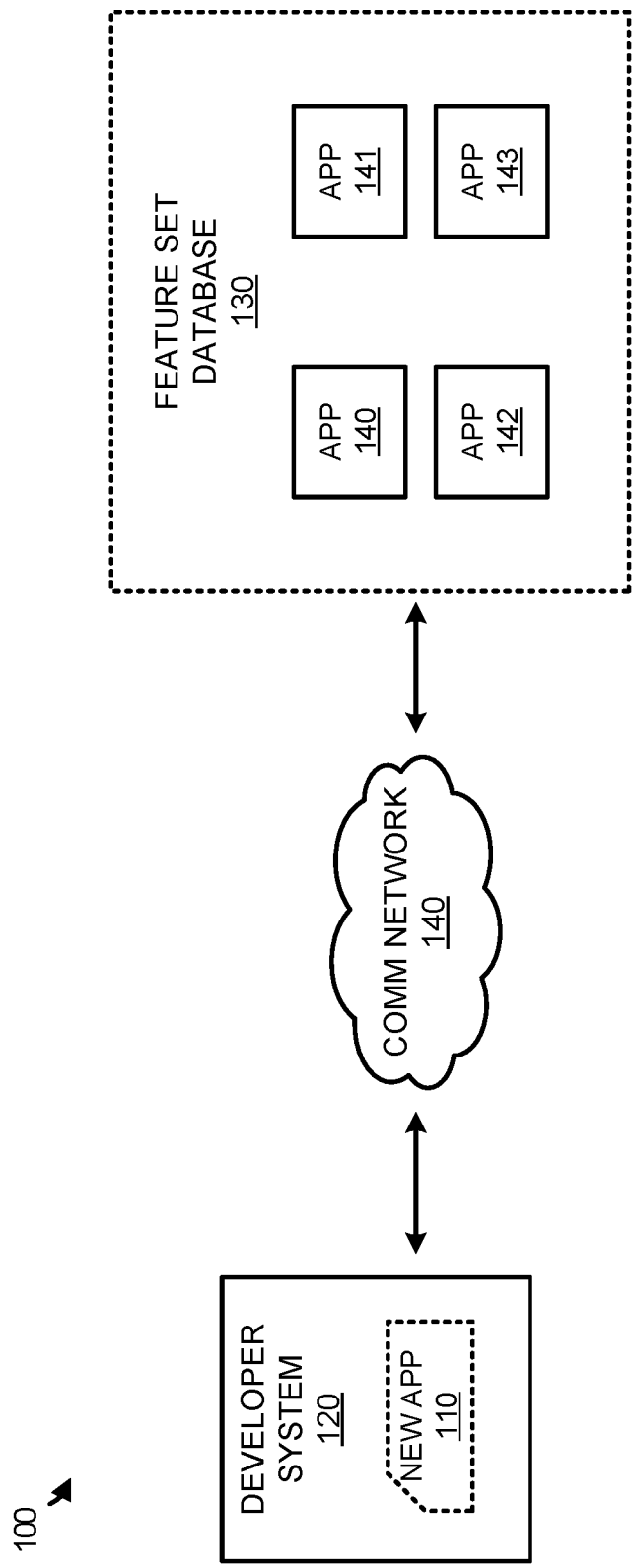
FIG. 1 illustrates a system to recommend feature sets to application developers according to one implementation.

To further demonstrate the operations of providing recommended feature sets, FIG. 1 is provided. FIG. 1 illustrates a system 100 to recommend feature sets to application developers according to one implementation. System 100 includes developer system 120, feature set database 130, and communication network 140. Feature set database 130 further includes applications 140-143, which are representative of the various feature sets for the individual applications.

In operation, developers generate applications that provide various security operations for computing networks of corporations, small businesses, partnerships, and other similar organization networks. These applications include various security responsibilities, such as firewall applications, data backup and storage applications, security threat and software ticket applications, or any other similar application. In development of these applications, the developers often generate commands and other prompts that allow administrators and users to change settings and preferences of the applications to provide the desired functionality. For example, in a firewall application, a developer may provide processes to block IP addresses, block domain names, block websites with particular content, or any other similar operation.

Here, developer system 120 may communicate with feature set database 130 via communication network 140 to retrieve information about feature sets for other applications of the same classification. These feature sets allow applications from different software distributors to provide the same security actions for administrators and users of computing networks. In particular, computing networks may include a variety of computing assets, such as end user computing devices, host computing devices, servers, routers, switches, and other similar computing assets that each operate using a variety of software configurations. Accordingly, because of the different computing assets and/or the different requirements of the assets, various security software from different distributors may be employed throughout the network. Rather than requiring the administrators of the network to learn and manage the different features of each of the applications, feature set database 130 may allow the developers of the applications to share their feature sets with one another, permitting the developers to apply a single feature set across a plurality of applications within the same classification.

In some implementations, the feature sets for the applications may be associated with a unified syntax or language that can be used to implement the required actions across applications from a variety of distributors. For example, referring to a firewall security application, an administrator at an administration console may request to block a particular IP address across all computing assets in a computing network. Rather than requiring the administrator to define the processes for each individual asset, a single command may be generated by the administrator that can be translated into the necessary processes for the individual assets. This translation is accomplished via the applications on the assets, wherein the feature sets implemented for the application translate the command into the required operations or procedures to implement the desired action. Accordingly, even though assets in the network may include firewalls from different software distributors, based on the shared feature set, administrators may quickly and efficiently apply security actions to the assets.

Figure 2:
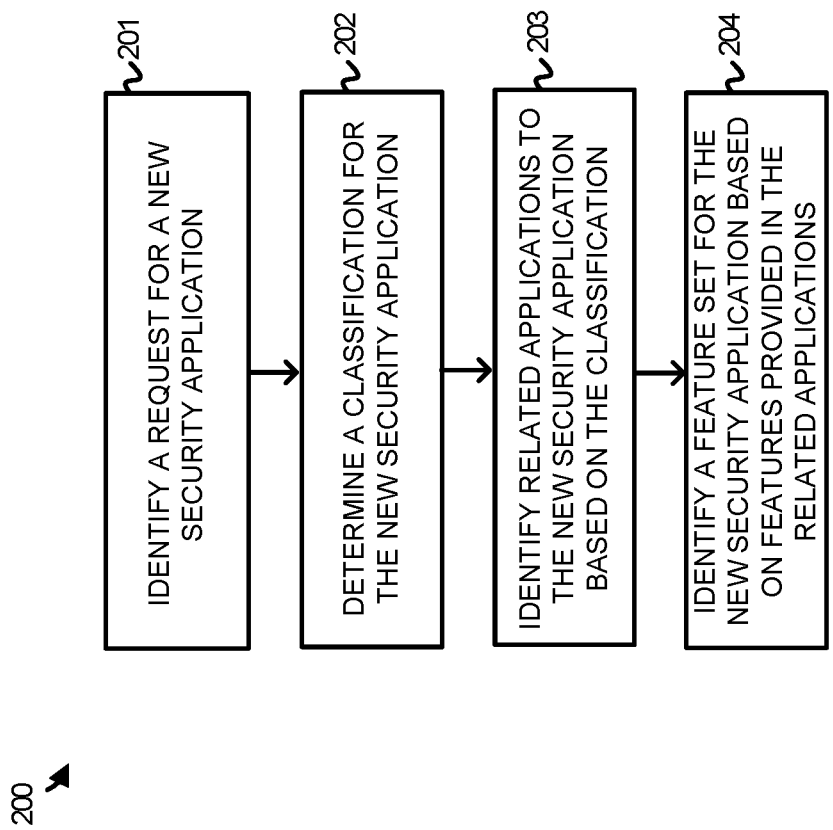
FIG. 2 illustrates a method of recommending feature sets to application developers according to one implementation.

Referring now to FIG. 2, FIG. 2 illustrates a method 200 of recommending feature sets to application developers according to one implementation. The processes of FIG. 2 are described with references to system 100 from FIG. 1.

As illustrated, method 200 includes identifying a request for a new security application (201). As illustrated in FIG. 1, developer system 120 is responsible for generating new application 110. New application 110 may comprise a firewall application, a data backup application, an antivirus application, an administration ticket application, or some other similar security application. During development of the application, developer system 120 may generate a request, which is identified by feature set database 130, requesting features that should be included in new application 110. Once the request is identified, method 200 further includes determining a classification for new security application 110 (202). In some implementations, the request transferred from developer system 120 to feature set database 130 includes an administrator defined classification for new application 110. For example, a user interface may be provided to developer system 120 wherein the user interface permits the user to select a classification of the application.

Based on the classification, method 200 also includes identifying related applications to the new security application based on the classification (203), and identifying a feature set for the new security application based on features provided in the related applications (204). For example, in response to the request for new application 110, feature set database 130 may identify one or more applications that apply to the classification, and identify a feature set that is used for the one or more applications. Once the feature set is identified, feature set database 130 may provide the feature set to developer system 120. In some examples, to provide the feature set, feature set database 130 may generate a display for the developer at developer system 120. This display may be included in an HTML file or some other display that can be provided to the administrator. In other examples, to provide the feature set to developer system 120, feature set database 130 may provide the feature set as data across communication network 140, wherein developer system 120 is configured to generate a display based on the data.

To generate feature set database 130, software distributors may subscribe to a platform that allows cohesive management of security actions in computing environments. Specifically, because computing environments may include a variety of software and hardware configurations, the platform may allow administrators and users of the various environments to implement security actions using a unified platform. Thus, rather than requiring the administrator to remember the necessary security procedures for each of the applications in the environments, a single command may be translated into the necessary procedures for each of the computing assets. As new applications are created and added to feature set database 130, new features are identified and can be provided to developers creating the next application. For example, if a firewall application added a feature to "block domain," then feature set database 130 may also be updated to reflect the new feature. Once updated, new application developers may identify what new features are available, and implement the new features within their application.

In some implementations, the features that are provided in the feature set for new application 110 may be associated with unified commands that can be used to implement actions across applications from multiple developers. For example, a feature requirement for an antivirus application may be "delete process." Rather than requiring an administrator to identify the required operations to remove a process on multiple assets with multiple security applications when a threat is identified, a unified command syntax associated with each feature may be used that is translated by the individual antivirus applications. Thus, the same command could be used to implement an action on a first application, and the same command could be used to implement the same action on a second application, even when the applications on different assets require different operations to implement the desired action.

Figure 3:
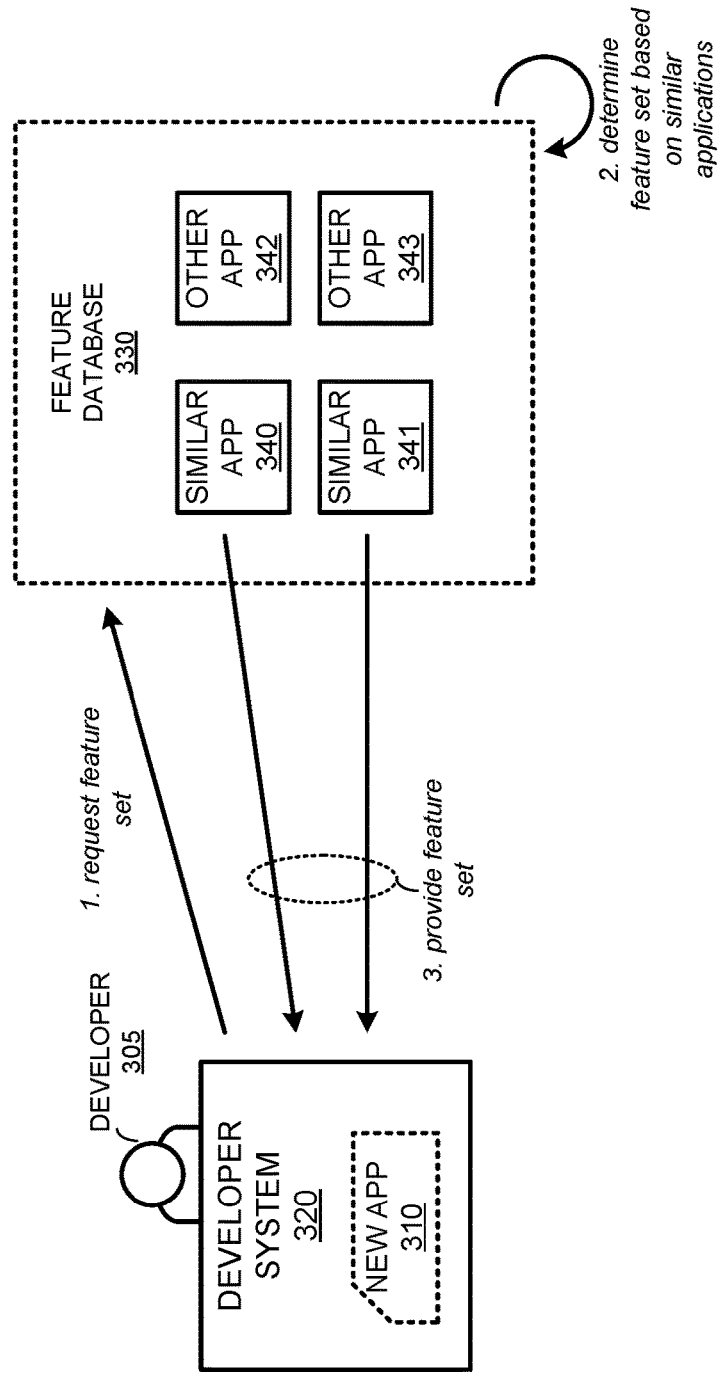
FIG. 3 illustrates an operational scenario of recommending feature sets to application developers according to one implementation.

Referring to FIG. 3, FIG. 3 illustrates an operational scenario 300 of recommending feature sets to application developers according to one implementation. Operational scenario 300 includes developer 305, developer system 320, and feature database 330. Feature database 330 is representative of a device or system of devices configured to manage features for various security applications.

As illustrated in FIG. 3, developer 305 is generating a new application 310 on developer system 320. This new application may include a firewall application, a data backup application, an antivirus application, or some other type of application. During the development of the application, a query, at step 1, may be generated from developer system 320 to feature database 330 to gather possible features that can be implemented in new application 310. In response to the query, feature database 330 may determine, at step 2, a feature set to be provided to developer system 320 based on applications similar to new application 310. In the present example, feature database 330 identifies that similar applications 340-341 have a similar classification to new application 310, whereas other applications 342-343 are not relevant to new application 310. As a result, features that are implemented within similar applications 340-341 are provided, at step 3, to developer system 320, allowing developer 305 to implement the features within application 310. For example, if new application 310 were an antivirus application for end user computing systems, feature database 330 may identify other antivirus applications generated by other developers for end user computing systems. Once the applications are identified, features, such as "remove process," "monitor process," and other similar antivirus features may be identified within the related applications and provided as a feature set to developer 305.

In some implementations, feature database 330 may be associated with a platform that allows administrators of various computing networks to implement security actions across computing assets within the individual computing networks. In particular, computing networks, such as those found in corporations, small businesses, partnerships, and the like may employ assets with various software and hardware configurations. These software and hardware configurations may include security applications from various developers and distributors. Here, by providing feature database 330, the various security software distributors that are employed within the network may be able to employ the same features or functionality, allowing an administrator to quickly generate an action across computing assets with different software or hardware configurations. For example, two computing assets may employ a different firewall application within a computing network. Accordingly, when an administrator of the network attempts to implement a security action, rather than requiring the user to provide the individual operations for each computing asset, a single feature may be selected by the administrator and implemented within the network. Thus, an administrator may select an action for the assets, such as "block IP address A," wherein the action (provided as a unified command for the particular feature) is translated by the individual applications into the required operations to be implemented on the desired asset.

In some examples, developer 305 may desire to implement a new feature within application 310 in addition to the features provided from similar applications 340-341. Accordingly, once a new feature is added to the application, the features of application 310 may be supplied to feature database 330, allowing other application developers to use the same features. For example, feature database 330 may already include features for a firewall application to block a particular IP address and block a particular domain name. However, developer 305 may develop a new feature to block particular content. Accordingly, the new feature to block content may be supplied to the next firewall developer. In some implementations, the features of each of the applications may be automatically determined when a new application is submitted to the feature database. However, in other examples, to generate the feature database, users may be required to provide specific information about each of the features implemented in the application. This information about the features may include a feature name, a code operation to implement the operation in the unified syntax for the applications in the same classification, the hardware and software configuration supported by the application, or any other similar information.

FIG. 4 illustrates a feature set data structure 400 to manage features for a plurality of applications according to one implementation. Feature set data structure 400 is an example data structure that can be used by a feature set database to store various features for security applications that can be employed in computing networks. Feature set data structure 400 comprises a table with application names 410, application types 411, and features 412-413. Application names 410 includes applications 420-427, and application types 411 include application (app) types 430-432. Although illustrated as a table in the present example, it should be understood that feature sets for each of the applications may be stored in one or more arrays, linked lists, or other similar data structures, including combinations thereof.

As described herein, security applications may be deployed in a computing network to provide various operations for the computing assets of the computing network. The security applications may include, but are not limited to, data backup applications, firewall applications, antivirus applications, encryption applications, and the computing assets may include server computing systems, end user computing systems, switches, routers, and the like. Because different computing assets within the computing network may deploy security software from different distributors, an administrator of the computing network may be required to understand the required processes to implement a desired action in each of the computing assets.

Here, a database may be provided to the software distributors, allowing the distributors to employ and share feature sets for the security software. Accordingly, rather than requiring the administrator to remember the processes and available feature sets for each of the security applications, the applications may share security actions features, allowing an administrator to deploy a security action across assets with various software and hardware configurations.

Referring still to FIG. 4, developers of a security application may query a database computing system to determine the current available feature set for security applications with a similar classification. This classification may include a firewall classification, an encryption classification, a data backup classification, an antivirus classification, or any other similar security classification. Based on the request and the classification, the database may identify the features that should be provided for the application, and supply the features to the developer to implement the features in the new application. Here, based on the classification supplied by the administrator, the feature set database may use the classification to determine an application type from application types 411. Accordingly, if the classification specified application type 430, applications 420-423 would be identified for the new application, along with the features from features 412-413. The features identified from feature set data structure 400 may then be supplied to the inquiring developer to be implemented in the new application. Although illustrated as listing the applications individually, it should be understood that in some implementations the applications for each application type may be aggregated prior to the inquiry. Accordingly, the aggregated feature sets may be supplied to a developer for each request.

In some implementations, the developer of the application may implement new features for their application. For example, a current feature set for firewall applications may include block IP address functions and block domain name functions. However, a developer may find it desirable to implement a function to block websites based on content provided within the website. Once the function is implemented and the application is complete, feature set information for the application may be added to feature set data structure 400, allowing future developers to implement similar functionality for their applications.

By allowing developers to implement the same feature sets, administrators may more quickly and efficiently apply security actions within a computing network. For example, an administrator may desire to block a particular IP address on multiple computing assets with varying software configurations. Rather the requiring the administrator to define the security process for each computing asset, the shared feature set may allow the administrator to define a block IP address action using a unified command language or other unified command structure. Once defined, the action could be applied to the individual assets using the shared feature set for the firewall applications.

Although not illustrated in feature set data structure 400, it should be understood that the data structure or structures managed by the database may also include unified syntax information. This unified syntax permits applications to implement the same features and simplify the operations performed by an administrator of a network. In at least one implementation, each of the applications with a particular feature may be capable of translating a command in the unified syntax and implementing the desired operation. For example, applications 420-423 with application type 430 may each be capable of implementing a particular feature. Thus, when an administrator initiates a command for a computing network, each application in applications 420-423 may translate the command in the unified format into the required operations to implement the desired command. By providing the unified syntax commands associated with a particular feature, a developer may ensure that each of the functions are capable of being implemented using the shared syntax. Accordingly, a single command may be translated to required actions across various applications, wherein the applications may share a feature set.

Figure 5:
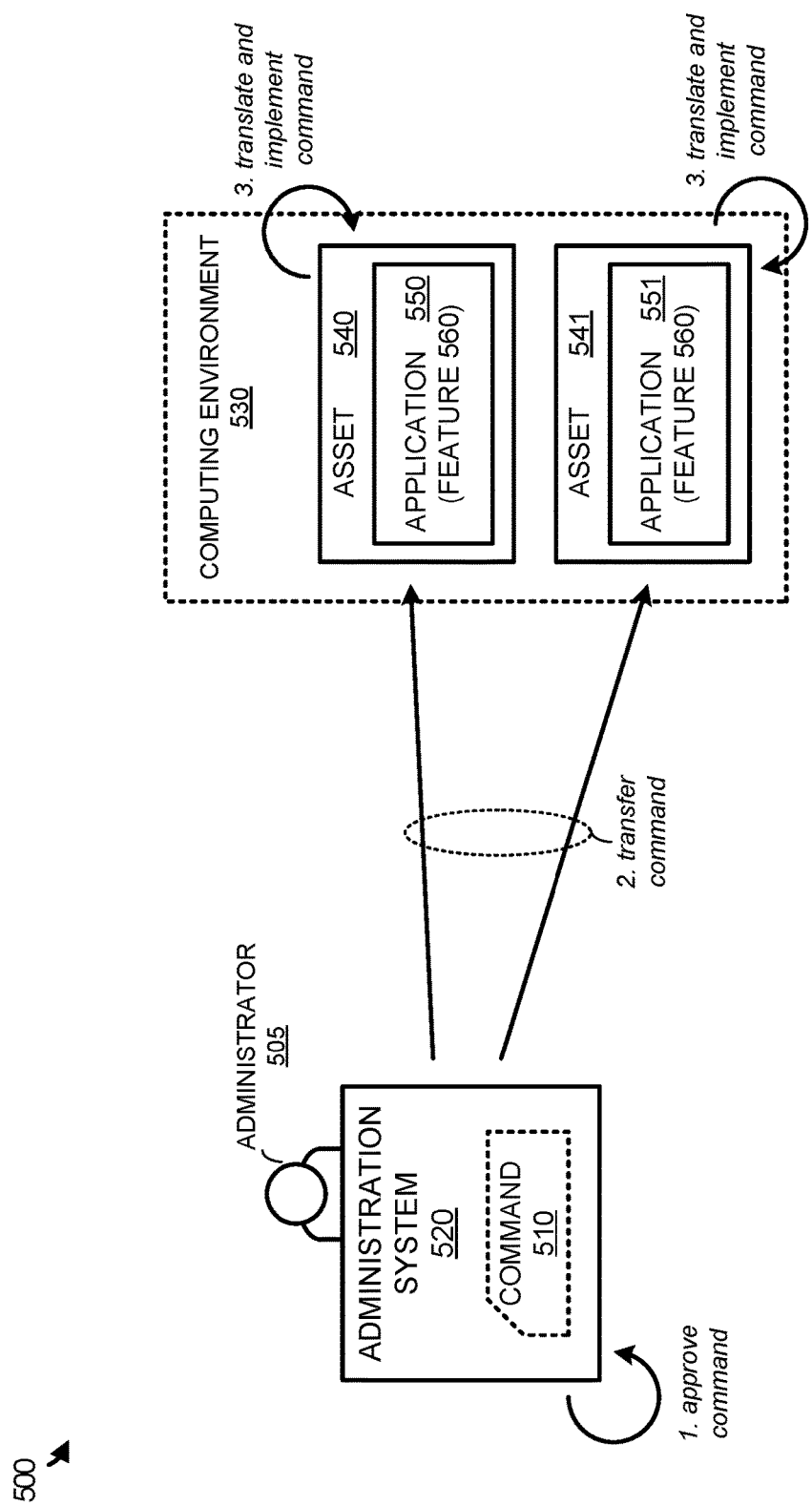
FIG. 5 illustrates an operational scenario of applying a unified command in a computing environment according to one implementation.

FIG. 5 illustrates an operational scenario 500 of applying a unified command in a computing environment according to one implementation. Operational scenario 500 includes administration system 520 with administrator 505 and computing environment 530. Computing environment 530 further includes assets 540-541 with applications 550-551. Although illustrated with two assets in the present implementation, it should be understood that any number of assets may be provided in an organizations computing network. These assets may include routers, end user computing systems, servers, switches, virtual machines, or any other similar computing system of a computing network.

As described herein, developers may develop a variety of security applications for an organization network to provide various operations within the network. These security applications may be developed for a particular hardware configuration or configurations, or may be developed for specific software configuration or configurations. To provide coherent management of each of the applications within the environment, the applications may be generated based on a feature set that is determined from other related applications. Thus, although applications may be generated by different developers, and may target different hardware and/or software configurations, the applications within the same classification can implement the same actions using the same included features. In some implementations, each of the features may further include a unified input and unified output, such that a unified command can be used to implement a security action on a first application and a second application.

Here, administrator 505 approves, at step 1, command 510 to be implemented within computing environment 530. In some implementations, command 510 may comprise a command that is written in a unified syntax by administrator 505. In other implementations, administration system 520 may be provided with a suggested input command as part of a response to a security threat. Once provided, administrator 505 may approve command 510 to be implemented in assets of the computing network. Once the command is approved, administration system 520 may transfer, at step 2, the command over a network to assets 540 and 541 to receive the command. Once the command is received by each of the assets, the assets translate and implement, at step 3, the command to provide the desired operation in computing environment 530. In the particular example of FIG. 5, because each application of applications 550-551 includes feature 560, the feature permits the application to identify the command associated with the feature and translate the command into the required operations to implement the desired feature.

For example, administrator 505 may select a command to block an IP address on assets 540-541. Responsive to the command that is received from the administration system, applications 550-551, which may comprise firewalls in the present example, may receive the command and translate the "block IP address" command into the required operations to block the address on the asset. These operations may include different operations due to the hardware or software configuration of assets 540-541, different operations due to developer preference, or any other similar reason for different operations. However, by permitting shared features on each of the applications to be implemented using a common input or command, an administrator is not required to implement the individual operations on each of the assets of the environment.

FIG. 6 illustrates an available features data set 600 according to one implementation. Available features data set 600 includes columns for feature identifiers 610, command structures 611, descriptions 612, and other information 613. Although illustrated as a table in the present example, it should be understood that any other similar data structure or presentation element may be provided for a developer with available features for an application. Further, while demonstrated with four fields in the columns of FIG. 6, it should be understood that any number of fields may be presented with information about the available features for a new security application.

In operation, a developer may desire to generate a new security application that can be implemented alongside one or more other applications of the same application type. For example, a developer may develop a firewall application for a specific hardware and/or software configuration to be implemented with similar functionality as other firewalls for other hardware and software configurations. To develop the application, a query may be generated and identified by a feature set database, wherein the feature set database identifies applications of the same categorization and identifies features from the applications of the same categorization. Once the features are identified as part of an available feature set, the features are provided to the developer, permitting the developer to implement the desired features in a new application.

Here, the feature set provided includes identifiers 620-627 and commands 630-637. Commands 630-637 are representative of a unified syntax or command structure that is used by an administration system in implementing a desired security action within a computing environment. For example, a firewall may include a unified command to "block IP address A on asset X", wherein A represents the IP address and X represents the particular asset. Accordingly, with the command structure, a developer may write a series of operations to translate the request in the command format into the required operations to block the required IP address. In the present implementation, in addition to the identifiers and the commands, available features data structure 600 further includes descriptions 612 and other information 613. Descriptions 612 may provide further descriptor information about a particular commands structure or the defined operations that must be completed by the command. Other information 613 may include information about the other applications that have implemented the particular feature, the number of other applications that have implemented the feature, the names of developers that have implemented the feature, or any other similar information about each of the features identified using identifiers 620-627.

Based on the information provided in data structure 600, the developer may select one or more of the features and implement them within the new application. Accordingly, once the application is deployed, the features may be implemented in the new application in a similar manner to other applications of similar type. In the particular example, when a feature is implemented, an administrator may use any of commands 630-637 to implement a desired action, wherein the commands may be translated by the new application into the required operations to implement the action.

Figure 7:
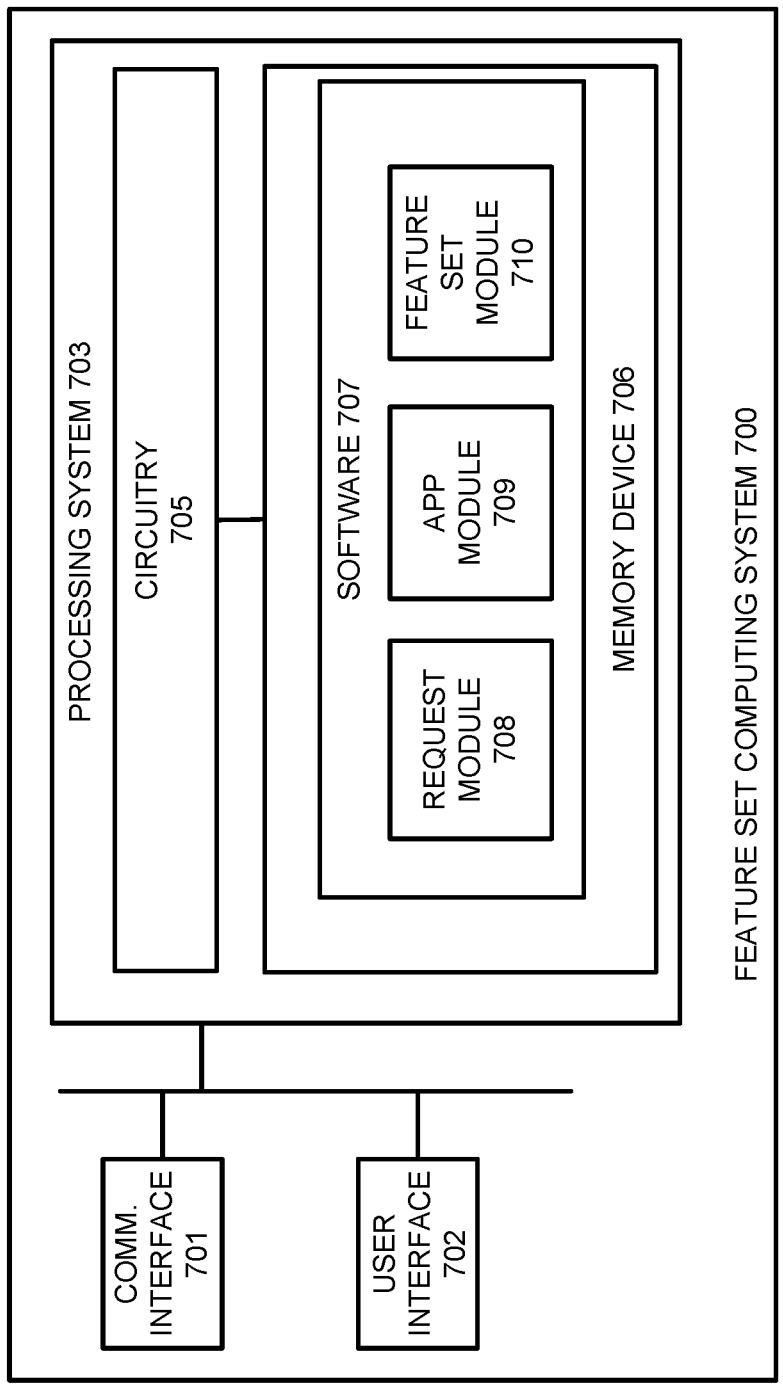
FIG. 7 illustrates a feature set computing system to provide application feature sets for new applications according to one implementation.

FIG. 7 illustrates a feature set computing system 700 to provide application feature sets for new applications. Feature set computing system 700 is representative of a computing system that may be employed in any computing apparatus, system, or device, or collections thereof, to suitably implement the feature set and feature databases described herein in FIGS. 1-5. Specifically, feature set computing system 700 is representative of feature set database 130 and feature database 330. Computing system 700 comprises communication interface 701, user interface 702, and processing system 703. Processing system 703 is communicatively linked to communication interface 701 and user interface 702. Processing system 703 includes processing circuitry 705 and memory device 706 that stores operating software 707.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use time-division multiplexing (TDM), IP, Ethernet, optical networking, wireless protocols, communication signaling, or some other communication format—including combinations thereof. In particular, communication interface 701 may communicate with a plurality of developer computing systems that develop security applications for computing networks.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable program instructions. Operating software 707 includes request module 708, application module 709, and feature set module 710, although any number of software modules may provide the same operation. Operating software 707 may further include an operating system, utilities, drivers, network interfaces, applications, or some other type of software. When executed by circuitry 705, operating software 707 directs processing system 703 to operate feature set computing system 700 as described herein.

In particular, request module 708 directs processing system 703 to identify a request for a feature set for a new security application. In some implementations, the request for the feature set may include a classification for the new application, wherein the classification may include a firewall application, an encryption application, a data backup application, or any other similar application. In response to the request, application module 709 directs processing system 703 to identify applications with the same classification as the new application. Once the similar applications are identified, feature set module 710 directs processing system 703 to determine a feature set based on the identified similar applications.

In some implementations, feature set computing system 700 may include a data structure that stores information about the various features that can be used for applications. For example, if a new firewall application were to be implemented, features for other firewall applications may be identified and supplied as a possible feature set to the requesting developer. In some instances, the feature sets may be associated with an administration platform that allows administrators of computing networks to implement security actions across a plurality of network assets with various configurations. Accordingly, by supplying feature sets to the software developers, an administration system may be used to select a single action (or command) from a feature set and implement the action across assets with various hardware and software configurations. For example, if the administrator desired to block a particular IP address, the user may provide a command to block the IP address, which can then be supplied to the assets associated with the command and the particular feature. Once received, the assets may translate the command for the feature into the required operations to implement the desire actions, which in this case would include adding an IP address to a block list for the asset.

Returning to the elements of FIG. 1, developer system 120 and feature set database 130 may each comprise one or more server computing systems, desktop computing systems, laptop computing systems, virtual machines, or other similar computing systems. Developer system 120 and feature set database 130 may each comprise communication interfaces, network interfaces, processing systems, computer systems, microprocessors, storage systems, storage media, or some other processing devices or software systems, and can be distributed among multiple devices. Although illustrated as separate in the example of FIG. 1, it should be understood that in some examples, developer system 120 may execute on the same computing system or systems as feature set database 130.

Communication network 140 comprises switches, wireless access nodes, Internet routers, network gateways, application servers, computer systems, communication links, or some other type of communication equipment—including combinations thereof. Communication network 140 may communicate with developer system 120 and feature set database 130 using metal, glass, optical, air, space, or some other material as the transport media. Communication network 140 may be configured to communicate using Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented method, comprising:
   receiving, by a service including an application features database, data indicating a particular set of application features implemented by a first software application, wherein the first software application is associated with a software classification of a plurality of software classifications, and wherein the application features database stores a set of application features implemented by software applications associated with the software classification;
   determining that the particular set of application features implemented by the first software application includes a new feature compared to the set of application features implemented by software applications associated with the software classification;
   adding the new feature to the set of application features to obtain an updated set of application features;
   receiving, over a network, a request for recommended application features to be implemented by a second software application being developed at a developer computer system, wherein the second software application is associated with the software classification; and
   sending data identifying the updated set of application features.

2. The computer-implemented method of claim 1, wherein the data indicating the particular set of application features implemented by the first software application includes information about the new feature, and wherein the information about the new feature includes at least one of: a feature name, a unified syntax operation name to be used to execute the new feature, a hardware configuration supported by the first software application, or a software configuration of the first software application.

3. The computer-implemented method of claim 1, wherein the first software application is associated with a first software developer, and wherein the second software application is associated with a second software developer that is different from the first software developer.

4. The computer-implemented method of claim 1, further comprising causing display of a graphical user interface including an interface element that enables a user to specify the software classification.

5. The computer-implemented method of claim 1, wherein the first software application is at least one of: a firewall application, an antivirus application, a ticketing application, a backup application, or a network security application.

6. The computer-implemented method of claim 1, wherein the software application is a security application, and wherein the application features include a feature used to respond to security threats associated with a computing network.

7. The computer-implemented method of claim 1, wherein the application feature database includes a plurality of classifications, and wherein each classification of the plurality of classifications is associated with a respective set of application features.

8. The computer-implemented method of claim 1, wherein an application feature of the set of application features is associated with a unified command of a unified command language defined by an administration system.

9. The computer-implemented method of claim 1, wherein the application features database stores, for at least one application feature of the set of application features, a description of operations to be performed to implement the at least one application feature.

10. The computer-implemented method of claim 1, further comprising determining, based on characteristics of the second software application, that the second software application is associated with the software classification.

11. The computer-implemented method of claim 1, wherein the request includes an identifier of the software classification associated with the second software application.

12. An apparatus comprising:
a processor;
a non-transitory computer readable storage medium storing instructions which, when executed by the processor, cause the processor to:
receive, by a service including an application features database, data indicating a particular set of application features implemented by a first software application, wherein the first software application is associated with a software classification of a plurality of software classifications, and wherein the application features database stores a set of application features implemented by software applications associated with the software classification;
determine that the particular set of application features implemented by the first software application includes a new feature compared to the set of application features implemented by software applications associated with the software classification;
add the new feature to the set of application features to obtain an updated set of application features;
receive, over a network, a request for recommended application features to be implemented by a second software application being developed at a developer computer system, wherein the second software application is associated with the software classification; and
send data identifying the updated set of application features.

13. The system of claim 12, wherein the data indicating the particular set of application features implemented by the first software application includes information about the new feature, and wherein the information about the new feature includes at least one of: a feature name, a unified syntax operation name to be used to execute the new feature, a hardware configuration supported by the first software application, or a software configuration of the first software application.

14. The system of claim 12, wherein the first software application is associated with a first software developer, and wherein the second software application is associated with a second software developer that is different from the first software developer.

15. The system of claim 12, wherein the instructions, when executed by the processor, further cause the processor to cause display of a graphical user interface including an interface element that enables a user to specify the software classification.

16. The system of claim 12, wherein the first software application is at least one of: a firewall application, an antivirus application, a ticketing application, a backup application, or a network security application.

17. A non-transitory computer readable storage medium storing instructions which, when executed by a processor, cause the processor to perform operations comprising:
receiving, by a service including an application features database, data indicating a particular set of application features implemented by a first software application, wherein the first software application is associated with a software classification of a plurality of software classifications, and wherein the application features database stores a set of application features implemented by software applications associated with the software classification;
determining that the particular set of application features implemented by the first software application includes a new feature compared to the set of application features implemented by software applications associated with the software classification;
adding the new feature to the set of application features to obtain an updated set of application features;
receiving, over a network, a request for recommended application features to be implemented by a second software application being developed at a developer computer system, wherein the second software application is associated with the software classification; and
sending data identifying the updated set of application features.

18. The non-transitory computer readable storage medium of claim 17, wherein the data indicating the particular set of application features implemented by the first software application includes information about the new feature, and wherein the information about the new feature includes at least one of: a feature name, a unified syntax operation name to be used to execute the new feature, a hardware configuration supported by the first software application, or a software configuration of the first software application.

19. The non-transitory computer readable storage medium of claim 17, wherein the first software application is associated with a first software developer, and wherein the second software application is associated with a second software developer that is different from the first software developer.

20. The non-transitory computer readable storage medium of claim 17, wherein the instructions, when executed by the processor, further cause the processor to perform operations comprising causing display of a graphical user interface including an interface element that enables a user to specify the software classification.

* * * * *